US012662162B2

(12) United States Patent
Koduvayur

(10) Patent No.: US 12,662,162 B2
(45) Date of Patent: Jun. 23, 2026

(54) MITIGATING OUTAGE OF SERVICE PROVIDED BY AUTONOMOUS VEHICLE

(71) Applicant: GM Cruise Holdings LLC, San Francisco, CA (US)

(72) Inventor: Srishti Koduvayur, Emeryville, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 413 days.

(21) Appl. No.: 18/158,073

(22) Filed: Jan. 23, 2023

(65) Prior Publication Data

US 2024/0246571 A1 Jul. 25, 2024

(51) Int. Cl.
B60W 60/00 (2020.01)

(52) U.S. Cl.
CPC ... B60W 60/00182 (2020.02); *B60W 2510/18* (2013.01); *B60W 2555/20* (2020.02)

(58) Field of Classification Search
CPC ....... B60W 60/00182; B60W 2510/18; B60W 2555/20
See application file for complete search history.

(56) References Cited

U.S. PATENT DOCUMENTS

| 11,119,477 | B1 * | 9/2021 | Konrardy | ........... | G01C 21/3617 |
| 2017/0287233 | A1 * | 10/2017 | Nix | ........................ | G08G 1/166 |
| 2021/0349772 | A1 * | 11/2021 | Kordjazi | ............. | G06F 11/3447 |
| 2023/0020966 | A1 * | 1/2023 | Foster | .............. | B60W 60/0015 |

FOREIGN PATENT DOCUMENTS

| CN | 108700876 | | * | 10/2018 | ............. | G08G 1/205 |
| CN | 108700876 | A | * | 10/2018 | ............. | G08G 1/205 |
| EP | 4180893 | | * | 5/2023 | ............. | G06V 20/58 |

OTHER PUBLICATIONS

Mohammed AS, Amamou A, Ayevide FK, Kelouwani S, Agbossou K, Zioui N. The Perception System of Intelligent Ground Vehicles in All Weather Conditions: A Systematic Literature Review. Sensors (Basel). Nov. 15, 2020;20(22):6532. (Year: 2020).*
B. Donmez, C. Nehme and M. L. Cummings, "Modeling Workload Impact in Multiple Unmanned Vehicle Supervisory Control," in IEEE Transactions on Systems, Man, and Cybernetics—Part A: Systems and Humans, vol. 40, No. 6, pp. 1180-1190, Nov. 2010, (Year: 2010).*
English translation of CN-108700876-A (Year: 2018).*

* cited by examiner

*Primary Examiner* — Joan T Goodbody
(74) *Attorney, Agent, or Firm* — Honigman LLP; Matthew H. Szalach; Jonathan P. O'Brien

(57) ABSTRACT

An AV may determine a degradation score based on data indicating a condition of an environment where the AV operates to provide a service. The degradation score may indicate a degradation in a performance of the AV (e.g., one or more sensors of the AV) under the condition. After determining that the degradation score is higher than a threshold, the AV may pause the service, e.g., by moving out of the traffic lane or pulling over. The AV may re-check the condition later and determine a new degradation score. After determining that degradation score is lower than the threshold, the AV may resume the service, e.g., by moving back to the traffic lane. The AV may determine that the degradation score is higher than another threshold and in response to the determination, stops where it is, e.g., in a traffic lane. The AV may request remote assistance or retrieval.

20 Claims, 7 Drawing Sheets

700

Determine a degradation score for a vehicle based on data indicating an environmental condition, the environmental condition being a condition of an environment where the vehicle performs an operation for providing a service, the degradation score indicating a degradation in a performance of the vehicle under the environmental condition
710

Determine whether the degradation score is beyond a threshold
720

In response to determining that the degradation score is beyond the threshold, cause the vehicle to pause the operation
730

Determine a new degradation score for the vehicle based on new data indicating the environmental condition at a later time, the new degradation score indicating a degradation in a performance of the vehicle under the environmental condition at the later time
740

Determine whether the new degradation score is beyond the threshold
750

In response to determining that the degradation score is beyond the threshold, cause the vehicle to resume the operation
760

<u>700</u>

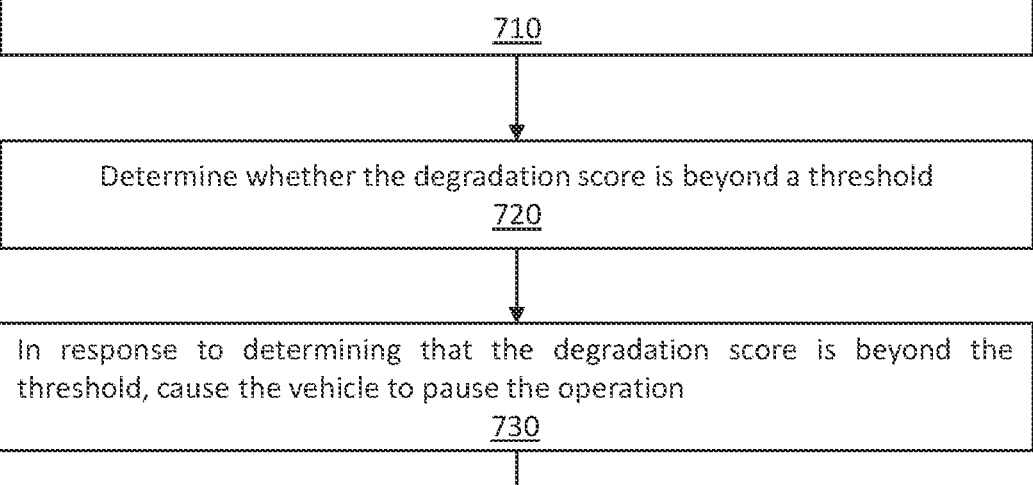

Determine a degradation score for a vehicle based on data indicating an environmental condition, the environmental condition being a condition of an environment where the vehicle performs an operation for providing a service, the degradation score indicating a degradation in a performance of the vehicle under the environmental condition
<u>710</u>

Determine whether the degradation score is beyond a threshold
<u>720</u>

In response to determining that the degradation score is beyond the threshold, cause the vehicle to pause the operation
<u>730</u>

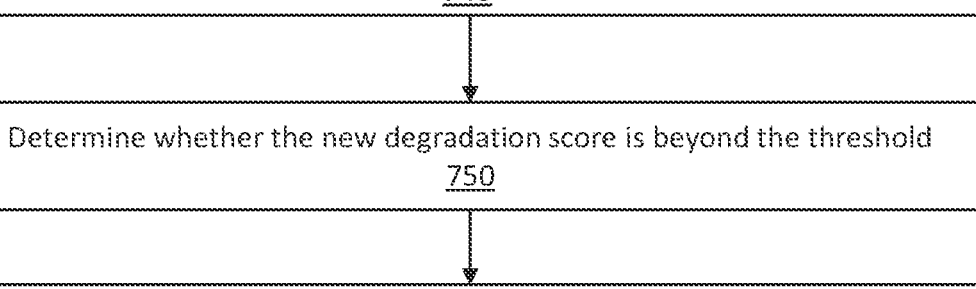

Determine a new degradation score for the vehicle based on new data indicating the environmental condition at a later time, the new degradation score indicating a degradation in a performance of the vehicle under the environmental condition at the later time
<u>740</u>

Determine whether the new degradation score is beyond the threshold
<u>750</u>

In response to determining that the degradation score is beyond the threshold, cause the vehicle to resume the operation
<u>760</u>

FIG. 7

MITIGATING OUTAGE OF SERVICE PROVIDED BY AUTONOMOUS VEHICLE

TECHNICAL FIELD OF THE DISCLOSURE

The present disclosure relates generally to autonomous vehicles (AVs) and, more specifically, to mitigating outage of service provided by AV.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a flowchart showing a method of mitigating an outage of a service provided by a vehicle, according to some embodiments of the present disclosure.

DESCRIPTION OF EXAMPLE EMBODIMENTS OF THE DISCLOSURE

Overview

Figure 1:
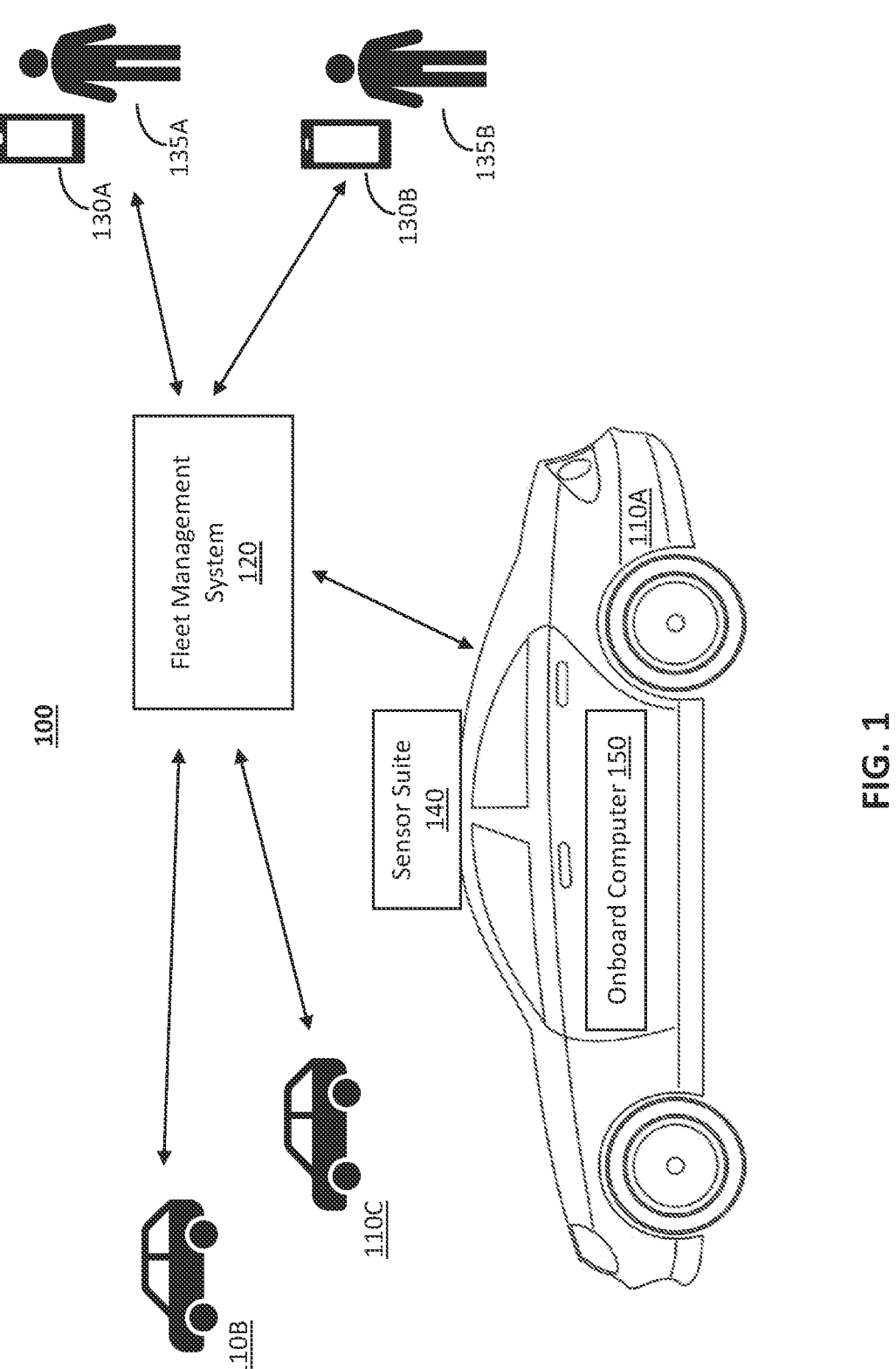
FIG. 1 illustrates a system including a fleet of AVs that can provide services to users, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless ride services. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. AVs can provide other driverless services too, such as delivery service. A person can request an AV to deliver one or more items from one location to another location, and the person does not have to drive or be a passenger of the AV for the delivery.

AVs may enter degraded states while they are providing services due to external factors (e.g., weather, traffic condition, network outage, etc.), internal factors (e.g., malfunction of AV components, regression in AV software, etc.), or a combination of both. Degradation in AV performance can cause service outages. In an example, inclement weather (e.g., fog, haze, snow, etc.) can interfere with the accuracy of the AV's sensors and the AV may not be able to drive safely. In another example, malfunction of an AV component or AV software can occur during a service, causing a failure of the service. In yet another example, an AV may be remotely controlled, e.g., by a system in communication with the AVs through a network, and an outage of the system or the network can cause an outage of the service provided by the AV. Currently available technologies usually provide a global response (e.g., immediate stop and vehicle retrieval) when any service outage occurs. However, such a global response is not optimal for all AV service outages. For instance, immediate stop and vehicle retrieval may be unnecessary for a service outage that can be mitigated. Also, immediate stop can block traffic or even have safety risks. Therefore, improved technologies for responding to AV service outage are needed.

Embodiments of the present disclosure provides a service outage mitigation platform that can mitigate outages of services provided by AVs based on analysis of degradations of AV performances during the services. For instance, the service outage mitigation platform may determine a response to a service outage based on the condition that triggers the degraded state of the AV, the severity level of the degraded state of the AV, the possibility of the AV recovering from the degraded state, other factors about the AV's degraded state, or some combination thereof. The service outage mitigation platform can facilitate different responses for service outages associated with different AV performance degradations.

In various embodiments of the present disclosure, a degradation score for an AV is determined, e.g., by an onboard computer of the AV, based on data indicating an environmental condition. The environmental condition may be a condition in an environment where the AV operates to provide a service. Examples of the environmental condition include weather condition, road condition, traffic condition, network condition, condition of a remote system associated with the AV, and so on. The degradation score indicates a degradation in a performance of the AV under the environmental condition. The degradation score may measure a severity level of the degradation. In some embodiments, the data may be generated by the AV itself. In an example, the data may be a point cloud generated by a LIDAR on the AV, and the degradation score may indicate the severity of a degradation in the accuracy of the LIDAR under a weather condition (e.g., fog, haze, snow, etc.). In other embodiments, the data may be received by the AV from the remote system or from another AV.

The degradation score may be compared with one or more threshold scores to determine the severity level of the AV's degradation. Different threshold scores may correspond to different levels of severity. In an example, a degradation score below a first threshold score may indicate that the AV is not in a degraded state and may continue to provide service, versus a degradation score greater than the first threshold score may indicate that the AV is in a degraded state and the AV may pause the service. The AV may further determine the severity level of the degraded state. In some embodiments, the AV may compare the degradation score with a second threshold score, which may be greater than the first threshold score. In embodiments where the degradation score is greater than the second threshold score, it may be determined that the severity level of the degradation is high. For instance, the severity level of the degradation is so high that it would be unsafe for the AV to continue driving. The AV may stop driving immediately and seek remote assistance, such as remote recovery or retrieval. In some embodiments, after determining that the degradation score is greater than the second threshold, the AV may provide another AV an instruction or recommendation of not entering the environment, e.g., through sending a message to the other AV or to the remote system in communication with the other AV. In an embodiment, a fleet of AVs may be partially or wholly suspended based on a detection of a severe environmental condition by one or more AVs. The one or more AVs may be in the same fleet or belong to a different fleet.

In embodiments where the degradation score is lower than the second threshold score, it may be determined that the severity level of the degraded state is low, and the AV may switch to a maneuver that allows the AV to recover from the degradation. The maneuver may include navigation that is not intended for the service but intended for placing the AV in a safe environment where the AV can recover from the degradation. Examples of the maneuver include pulling over, driving to a parking area and parking there, returning to home facility, circling around an area (e.g., a block), and so on. The AV may try to recover from the degraded state during or after the maneuver. During the recovery, the AV may re-evaluate the degraded state. For instance, the AV may request new data of the environmental condition, e.g., at a predetermined frequency, and may receive a new data set in response to each request. A new degradation score may be determined based on the new data set and be compared with the one or more threshold scores. The AV may resume the service after determining that the new degradation score is below the threshold, indicating that the degraded state is gone. In scenarios where the new degradation score is greater than the threshold score, the AV may continue to pause the service for recovery or to seek remote assistance. The AV may also communicate with one or more other AVs and inform the other AVs whether it is safe to operate in the environment based on the degradation score(s) determined by the AV. In a scenario where the degradation of the AV is caused by an outage of a connection of the AV with another system (e.g., a fleet management system), the AV may check (e.g., periodically check) the connection during the recovery and resume its operation after it determines that the connection is established.

The present disclosure can provide dynamic, customized resilience plans to address AV service outages triggered by AV degradations with different severity levels. The service outage mitigation platform in the present disclosure can facilitate distinction of sever degradations from less severe degradations and respond accordingly. Compared with currently availably technologies, the present disclosure provides a more advantageous approach to mitigate AV service outages.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System Including AVs

FIG. 1 illustrates a system 100 including a fleet of AVs that can provide services to users, according to some embodiments of the present disclosure. The system 100 includes AVs 110A-110C (collectively referred to as "AVs 110" or "AV 110"), a fleet management system 120, and client devices 130A and 130B (collectively referred to as "client devices 130" or "client device 130"). The client devices 130A and 130B are associated with users 135A and 135B, respectively. The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage operations of the AVs 110. For instance, the fleet management system 120 may provide software ("AV software") to the fleet of AVs 110. The software, when executed by processors, may control operations of the AVs 110. The fleet management system 120 may provide different software to different AVs 110. The fleet management system 120 may also update software, e.g., by changing one or more components in a version of the AV software and releasing a new software version. The fleet management system 120 may also provide information to AVs 110 for the AVs 110 to operate based on the information. For instance, the fleet management system 120 may provide information about environmental conditions to AVs 110. An environment condition may be a condition in an environment where one or more AVs 110 operate or will operate. Examples of environmental conditions include weather condition (e.g., rain, snow, wind, etc.), road condition (e.g., road closures, water accumulation, road grade indicating a rate of change of the road elevation, etc.), traffic condition (e.g., traffic congestion, accidents, etc.), other types of environmental conditions, or some combination thereof. An AV 110 may use one or more environmental conditions to control its operation, e.g., to control its motions in the environment.

In some embodiments, the fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicates with the fleet management system 120. The AVs 110 and fleet management system 120 may connect over a network, such as the Internet.

In some embodiments, the fleet management system 120 may receive service requests for the AVs 110 from the client devices 130. In an example, the user 135A may access an app executing on the client device 130A and requests a ride from a pickup location (e.g., the current location of the client device 130A) to a destination location. The client device 130A may transmit the ride request to the fleet management system 120. The fleet management system 120 may select an AV 110 from the fleet of AVs 110 and dispatches the selected AV 110A to the pickup location to carry out the ride request. In some embodiments, the ride request may further include a number of passengers in the group. In some embodiments, the ride request may indicate whether a user 135 is interested in a shared ride with another user traveling in the same direction or along the same portion of a route. The ride request, or settings previously entered by the user 135, may further indicate whether the user 135 is interested in interaction with another passenger. Certain aspects of the fleet management system 120 are described below in conjunction with FIG. 5.

A client device 130 may be a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit one or more service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to deliver one or more items from a location to another location), and so on. The UI may allow users 135 to provide locations (e.g., pickup location, destination location, etc.) or other information that would be needed by AVs 110 to provide services requested by the users 135. The client device 130 may also provide the user 135 an UI through which the user 135 may specify preference for AV motions during an AV service that has been requested or to be requested by the user 135. For example, the user 135 may specify, through the UI, how fast the user 135 prefers the AV 110 to move, turn, stop, accelerate, or decelerate.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may detect conditions inside and outside the AV 110. For instance, the sensor suite 140 may detect conditions in an environment surrounding the AV 110. The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 2.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140 but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction.

As another example, the onboard computer 150 may receive from the fleet management system 120 a request for sensor data to be used for determining environmental conditions. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on. Certain aspects of the onboard computer 150 are described further in relation to FIG. 6.

Example Sensor Suite

Figure 2:
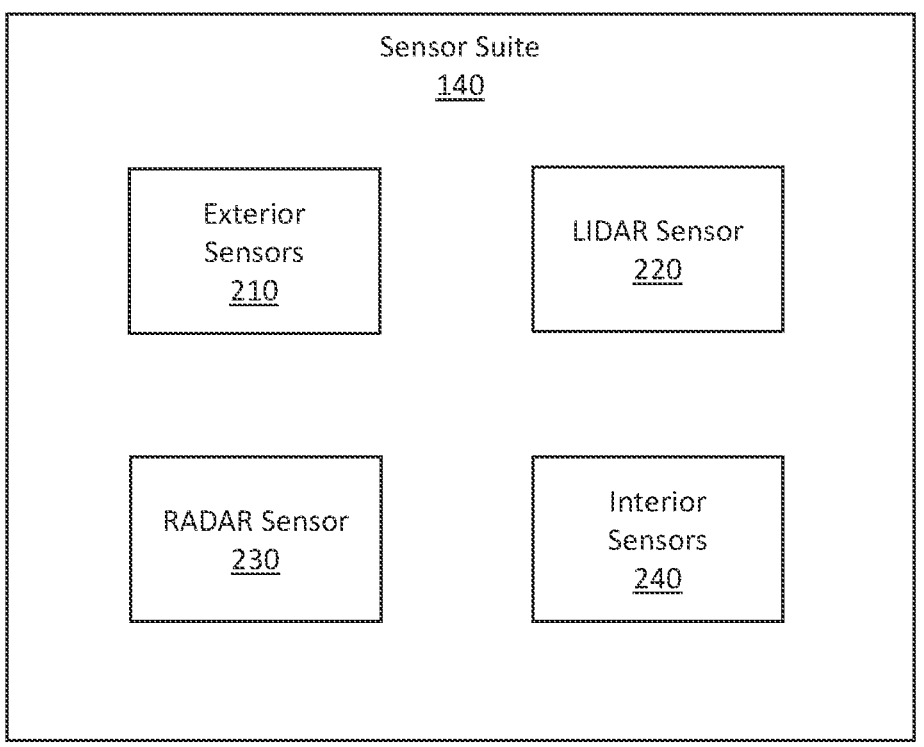
FIG. 2 is a block diagram showing a sensor suite, according to some embodiments of the present disclosure.

FIG. 2 is a block diagram showing the sensor suite 140, according to some embodiments of the present disclosure. The sensor suite 140 may be an onboard sensor suite of an AV, e.g., AV 110 in FIG. 1. The sensor suite 140 includes exterior sensors 210, a LIDAR sensor 220, a RADAR sensor 230, and interior sensors 240. The sensor suite 140 may include any number of the types of sensors shown in FIG. 2, e.g., one or more LIDAR sensors 220, one or more RADAR sensors 230, etc. The sensor suite 140 may have more types of sensors than those shown in FIG. 2, such as the sensors described with respect to FIG. 1. In other embodiments, the sensor suite 140 may not include one or more of the sensors shown in FIG. 2.

The exterior sensors 210 may detect objects in an environment around the AV. The environment may include a scene in which the AV operates. Example objects include objects related to weather (e.g., fog, rain, snow, haze, etc.), persons, buildings, traffic lights, traffic signs, vehicles, street signs, trees, plants, animals, or other types of objects that may be present in the environment around the AV. In some embodiments, the exterior sensors 210 include exterior cameras having different views, e.g., a front-facing camera, a back-facing camera, and side-facing cameras. One or more exterior sensors 210 may be implemented using a high-resolution imager with a fixed mounting and field of view. One or more exterior sensors 210 may have adjustable field of views and/or adjustable zooms. In some embodiments, the exterior sensors 210 may operate continually during operation of the AV. In an example embodiment, the exterior sensors 210 capture sensor data (e.g., images, etc.) of a scene in which the AV drives. In other embodiment, the exterior sensors 210 may operate in accordance with an instruction from the onboard computer 150 or an external system, such as the vehicle manager 530 of the fleet management system 120. Some of all of the exterior sensors 210 may capture sensor data of one or more objects in an environment surrounding the AV based on the instruction.

The LIDAR sensor 220 may measure distances to objects in the vicinity of the AV using reflected laser light. The LIDAR sensor 220 may be a scanning LIDAR that provides a point cloud of the region scanned. The LIDAR sensor 220 may have a fixed field of view or a dynamically configurable field of view. The LIDAR sensor 220 may produce a point cloud that describes, among other things, distances to various objects in the environment of the AV.

The RADAR sensor 230 may measure ranges and speeds of objects in the vicinity of the AV using reflected radio waves. The RADAR sensor 230 may be implemented using a scanning RADAR with a fixed field of view or a dynamically configurable field of view. The RADAR sensor 230 may include one or more articulating RADAR sensors, long-range RADAR sensors, short-range RADAR sensors, or some combination thereof.

The interior sensors 240 may detect the interior of the AV, such as objects inside the AV. Example objects inside the AV include users (e.g., passengers), client devices of users, components of the AV, items delivered by the AV, items facilitating services provided by the AV, and so on. The interior sensors 240 may include multiple interior cameras to capture different views, e.g., to capture views of an interior feature, or portions of an interior feature. The interior sensors 240 may be implemented with a fixed mounting and fixed field of view, or the interior sensors 240 may have adjustable field of views and/or adjustable zooms, e.g., to focus on one or more interior features of the AV. The interior sensors 240 may transmit sensor data to a perception module (such as the perception module 330 described below in conjunction with FIG. 3), which can use the sensor data to classify a feature and/or to determine a status of a feature.

In some embodiments, the interior sensors 240 include on or more input sensors that allow users 135 to provide input. For instance, a user 135 may use an input sensor to provide information indicating his/her preference for one or more motions of the AV during the ride. The input sensors may include touch screen, microphone, keyboard, mouse, or other types of input devices. In an example, the interior sensors 240 include a touch screen that is controlled by the onboard computer 150. The onboard computer 150 may present questionnaires on the touch screen and receive user answers to the questionnaires through the touch screen. A questionnaire may include one or more questions about AV motions. The onboard computer 150 may receive the questions from the fleet management system 120. In some embodiments, some or all of the interior sensors 240 may operate continually during operation of the AV. In other embodiment, some or all of the interior sensors 240 may operate in accordance with an instruction from the onboard computer 150 or an external system, such as the fleet management system 120.

Example Onboard Computer

Figure 3:
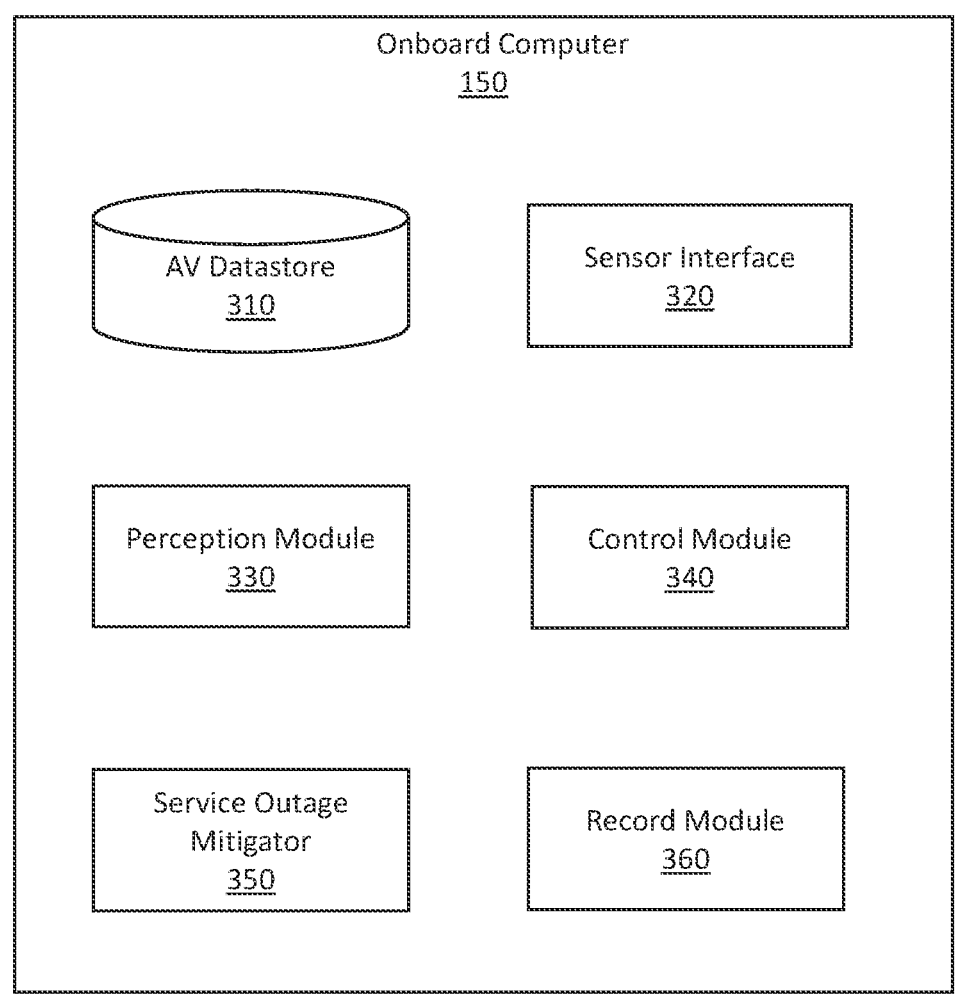
FIG. 3 is a block diagram showing an onboard computer, according to some embodiments of the present disclosure.

FIG. 3 is a block diagram showing the onboard computer 150 according to some embodiments of the present disclosure. The onboard computer 150 may control an AV, e.g., AV 110 in FIG. 1. As shown in FIG. 3, the onboard computer 150 includes an AV datastore 310, a sensor interface 320, a perception module 330, a control module 340, a service outage mitigator 350, and a record module 360. In alternative configurations, fewer, different and/or additional components may be included in the onboard computer 150. For example, components and modules for conducting route planning, controlling movements of the AV, and other vehicle functions are not shown in FIG. 3. Further, functionality attributed to one component of the onboard computer 150 may be accomplished by a different component included in the onboard computer 150 or a different system, such as the fleet management system 120.

The AV datastore 310 stores data associated with operations of the AV. The AV datastore 310 may store one or more operation records of the AV. An operation record is a record of an operation of the AV, e.g., an operation for providing a ride service. The operation record may include information indicating operational behaviors of the AV during the operation. The operations record may also include data used, received, or captured by the AV during the operation, such as map data, instructions from the fleet management system 120, sensor data captured by the AV, and so on. In some embodiments, the AV datastore 310 stores a detailed map that includes a current environment of the AV. The AV datastore 310 may store data in the map datastore 250. In some embodiments, the AV datastore 310 stores a subset of the map datastore 250, e.g., map data for a city or region in which the AV is located.

The sensor interface 320 interfaces with the sensors in the sensor suite 140. The sensor interface 320 may request data from the sensor suite 140, e.g., by requesting that a sensor capture data in a particular direction or at a particular time. For example, the sensor interface 320 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 320 may request the sensor(s) to capture data. The request may further provide one or more settings of a sensor, such as orientation, resolution, accuracy, focal length, and so on. The sensor interface 320 can request the sensor to capture data in accordance with the one or more settings.

A request for sensor data may be a request for real-time sensor data, and the sensor interface 320 can instruct the sensor suite 140 to immediately capture the sensor data and to immediately send the sensor data to the sensor interface 320. The sensor interface 320 is configured to receive data captured by sensors of the sensor suite 140, including data from exterior sensors mounted to the outside of the AV, and data from interior sensors mounted in the passenger compartment of the AV. The sensor interface 320 may have subcomponents for interfacing with individual sensors or groups of sensors of the sensor suite 140, such as a camera interface, a LIDAR interface, a RADAR interface, a microphone interface, etc.

The perception module 330 identifies objects and/or other features captured by the sensors of the AV. For example, the perception module 330 identifies objects in the environment of the AV and captured by one or more sensors (e.g., the sensors 210-230). As another example, the perception module 330 determines one or more environmental conditions based on sensor data from one or more sensors (e.g., the sensors 210-230). The perception module 330 may include one or more classifiers trained using machine learning to identify particular objects. For example, a multi-class classifier may be used to classify each object in the environment of the AV as one of a set of potential objects, e.g., a vehicle, a pedestrian, or a cyclist. As another example, a pedestrian classifier recognizes pedestrians in the environment of the AV, a vehicle classifier recognizes vehicles in the environment of the AV, etc. The perception module 330 may identify travel speeds of identified objects based on data from the RADAR sensor 230, e.g., speeds at which other vehicles, pedestrians, or birds are traveling. As another example, the perception module 33—may identify distances to identified objects based on data (e.g., a captured point cloud) from the LIDAR sensor 220, e.g., a distance to a particular vehicle, building, or other feature identified by the perception module 330. The perception module 330 may also identify other features or characteristics of objects in the environment of the AV based on image data or other sensor data, e.g., colors (e.g., the colors of Christmas lights), sizes (e.g., heights of people or buildings in the environment), makes and models of vehicles, pictures and/or words on billboards, etc.

In some embodiments, the perception module 330 fuses data from one or more interior sensors 240 with data from exterior sensors (e.g., exterior sensors 210) and/or AV datastore 310 to identify environmental objects that one or more users are looking at. The perception module 330 determines, based on an image of a user, a direction in which the user is looking, e.g., a vector extending from the user and out of the AV in a particular direction. The perception module 330 compares this vector to data describing features in the environment of the AV, including the features' relative location to the AV (e.g., based on real-time data from exterior sensors and/or the AV's real-time location) to identify a feature in the environment that the user is looking at.

While a single perception module 330 is shown in FIG. 3, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 340 controls operations of the AV, e.g., based on information from the sensor interface 320 or the perception module 330. The control module 340 may determine motion capacities of the AV, e.g., based on conditions in environments where the AV operates, preferences of users requesting services conducted by the AV, other types of information, or some combination thereof. In some embodiments, the control module 340 may include multiple planning modules (also referred to as "planners") that can plan motions of the AV during the AV's operations based on information from the fleet management system 120, information from the sensor interface 320 or perception module 330, other information, or some combination thereof. The planning modules may determine a motion parameter that specifies a motion to be performed by the AV in the operation. The motion parameter may be a speed, acceleration rate, deceleration rate, jerk, snap, curvature, orientation, etc. Different planning modules may make different plans for the AV. The planning modules may use different models to make the different plans. In some embodiments, the planning modules may produce a single plan for the operation of the AV. In an example, the planning modules may run in a sequence. For instance, a planning module may generate a plan, and another planning module may generate another plan based on the plan. The output from the last planning module in the sequence may be the final plan for the AV's operation. The output may include commands, e.g., commands to one or more actuators in the AV.

In some embodiments, the control module 340 controls operation of the AV by using a trained model, such as a trained neural network. The control module 340 may provide input data to the control model, and the control model outputs operation parameters for the AV. The input data may include sensor data from the sensor interface 320 (which may indicate a current state of the AV), objects identified by the perception module 330, or both. The operation parameters are parameters indicating operation to be performed by the AV. The operation of the AV may include perception, prediction, planning, localization, motion, navigation, other types of operation, or some combination thereof.

The control module 340 may provide instructions to various components of the AV based on the output of the control model, and these components of the AV will operate in accordance with the instructions. In an example where the output of the control model indicates that a change of traveling speed of the AV is required given a prediction of traffic condition, the control module 340 may instruct the motor of the AV to change the traveling speed of the AV. In another example where the output of the control model indicates a need to detect characteristics of an object in the environment around the AV (e.g., detect a speed limit), the control module 340 may instruct the sensor suite 140 to capture an image of the speed limit sign with sufficient resolution to read the speed limit and instruct the perception module 330 to identify the speed limit in the image. In some embodiments, the control module 340 may control one or more actuators in the AV based on an output of one or more planners. In some embodiments, the control module 340 may execute commands in the output of a planner to drive operations of the one or more actuators. The operations of the actuators can cause the AV motions planned by the planner.

The service outage mitigator 350 mitigates outages of services provided by the AV through responding to the outages based on severity levels of degradations of the AV that caused the outages. The service outage mitigator 350 may determine a degradation score based on data indicating a condition of an environment where the AV operates to provide a service. The degradation score may indicate a degradation in a performance of the AV (e.g., one or more sensors of the AV) under the condition. After determining that the degradation score is higher than a threshold, the service outage mitigator 350 may determine that the AV is in a degraded state and cause the AV (e.g., by instructing the control module 340) to pause the service, e.g., by moving out of the traffic lane or pulling over.

The service outage mitigator 350 may facilitate a recovery of the condition. For instance, the service outage mitigator 350 may cause the AV to drive or stop at a safe area for a certain amount of time, during which the service outage mitigator 350 can re-evaluate the condition and determine whether the degradation is being improved or even eliminated during the recovery time. The service outage mitigator 350 may determine a new degradation score for the AV for each re-evaluation cycle during the recovery time, and multiple cycles of re-evaluation may be performed during the recovery time. After determining that the new degradation score is lower than the threshold (which indicates that the recovery is successful), the service outage mitigator 350 may cause the AV (e.g., by instructing the control module 340) to resume the service. In embodiments where the AV cannot resume the service (e.g., the service has been completed by another AV or has been canceled), the service outage mitigator 350 may cause the AV to go back to the home facility where the AV may receive a new service to perform.

In some embodiments, the service outage mitigator 350 may compare a degradation score (either the initial degradation score or a degradation score determined during recovery) with an additional threshold and in response to determining that the degradation score is higher than the additional threshold, cause the AV to stop driving immediately, e.g., to stop in the traffic lane where the AV was driving. The additional threshold may indicate a high-severity level of the AV's degraded state, e.g., a degradation level that makes it unsafe for the AV to drive. The service outage mitigator 350 may request remote assistance to remotely recover the AV or to retrieve the AV from the environment. Certain aspects of the service outage mitigator 350 are provided below in conjunction with FIGS. 4, 6, and 7.

The record module 360 generates operation records of the AV and stores the operations records in the AV datastore 310. The record module 360 may generate an operation record in accordance with an instruction from the fleet management system 120, e.g., the vehicle manager 530. The instruction may specify data to be included in the operation record. The record module 360 may determine one or more timestamps for an operation record. In an example of an operation record for a ride service, the record module 360 may generate timestamps indicating the time when the ride service starts, the time when the ride service ends, times of specific AV behaviors associated with the ride service, and so on. The record module 360 can transmit the operation record to the fleet management system 120.

Example Service Outage Mitigator

Figure 4:
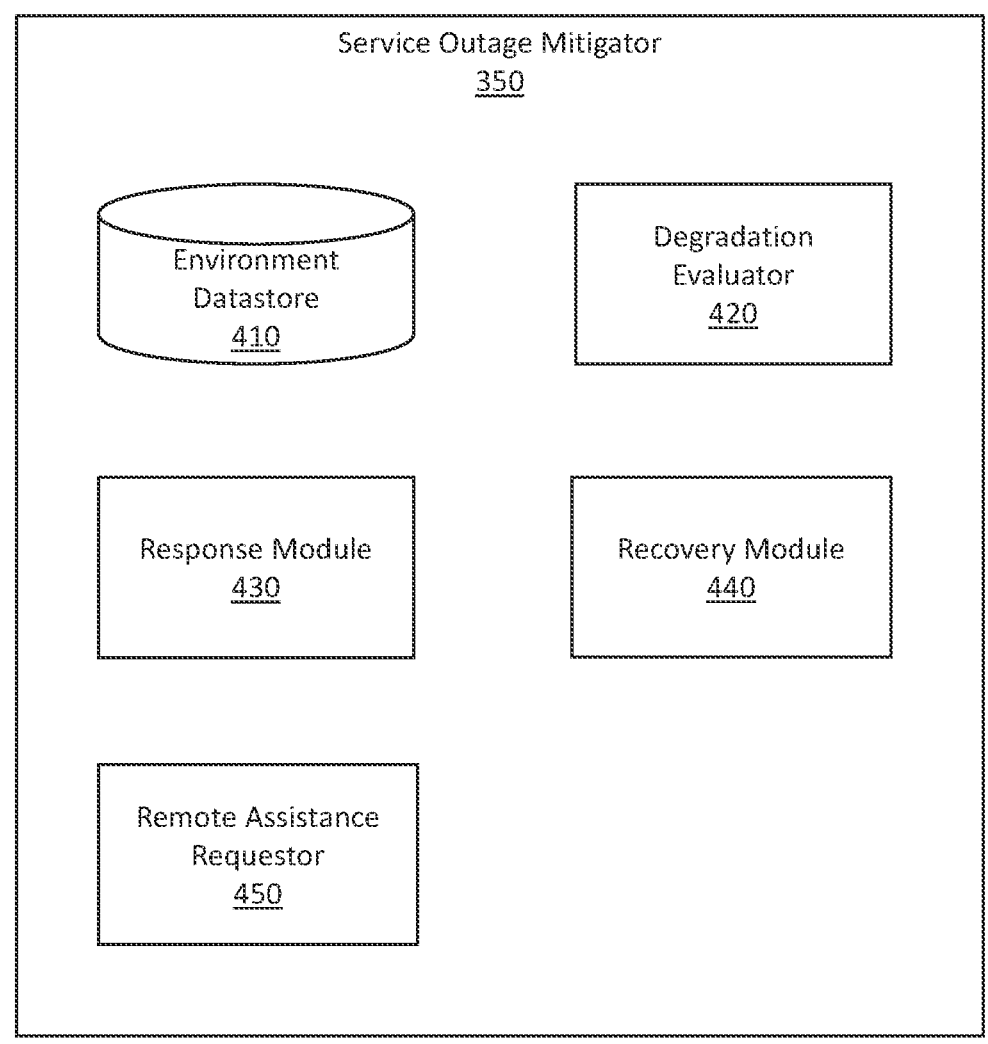
FIG. 4 is a block diagram showing a service outage mitigator, according to some embodiments of the present disclosure.

FIG. 4 is a block diagram showing a service outage mitigator 350, according to some embodiments of the present disclosure. The service outage mitigator 350 includes an environment datastore 410, a degradation evaluator 420, a response module 430, a recovery module 440, and a remote assistance requestor 450. In alternative configurations, different and/or additional components may be included in the service outage mitigator 350. Further, functionality attributed to one component of the service outage mitigator 350 may be accomplished by a different component included in the service outage mitigator 350, a different component included in the onboard computer 150, or a different system (such as the fleet management system 120).

The environment datastore 410 may store data of environment conditions that can be used by the service outage mitigator 350 to detect and evaluate degradations of the AV. The data may include sensor data capturing one or more environments where the AV operates, e.g., operates to provide services. The sensor data may be from the sensor suite 140 of the AV. The data may also include perception data that identifies one or more environmental conditions. The perfection data may be from the perception module 330 of the onboard computer 150 of the AV. The data may also include external data, e.g., data from other AVs or systems. For example, the data in the environment datastore 410 may include data (e.g., sensor data, perception, etc.) from one or more other AVs that capture one or more environments where the other AVs operate. As another example, the data in the environment datastore 410 may include data from the fleet management system 120, e.g., the environmental condition module 520 in FIG. 5. In yet another example, the data in the environment datastore 410 may include data from one or more third-party systems that provide information of environments where the AV operates. The AV may be in communication with the one or more third-party systems, e.g., through a network.

The degradation evaluator 420 determines whether the AV is in a degraded state. In some embodiments, the degradation evaluator 420 determines a degradation score for the AV based on data indicating an environmental condition. The environmental condition may be a condition in an environment where the AV operates to provide a service. Examples of the environmental condition include weather condition, road condition, traffic condition, network condition, condition of a remote system associated with the AV, and so on. The degradation score indicates a degradation in a performance of the AV under the environmental condition. The degradation may be a failure or malfunction of the AV itself, an external failure or malfunction, or a combination of both. A failure or malfunction of the AV itself may include a malfunction of one or more components of the AV, such as sensor (e.g., sensors in the sensor suite 140), motor, brake, door, and so on. A failure or malfunction of the AV itself may alternatively or additionally include a regression in the AV software. An external failure or malfunction may include an outage of the network to which the AV is connected, an outage of a component of the fleet management system 120 (e.g., the vehicle manager 530 in FIG. 5), an outage of a home facility of the AV, and so on.

In some embodiments, the degradation evaluator 420 determines the degradation score based on the data indicating the environmental condition and additional data indicating a reference performance of the AV. In an embodiment, the additional data may be data captured while the AV was operating without any degradation. In another embodiment, the additional data may be data indicating a performance of another AV that has no degradation. In yet another embodiment, the additional data may be reference data from a historical record or manual for a component of the AV, the AV, or the fleet to which the AV belongs. In an example where the data is sensor data captured by the AV's sensor suite while the AV operates under the environmental condition, the additional data may be the same type of sensor data captured by the AV's sensor suite (e.g., data captured by the same sensor(s)) at an earlier time (e.g., a time where the environmental condition was not present). The degradation evaluator 420 may compare the sensor data with the earlier sensor data to evaluate the degradation of the sensor(s) capturing the sensor data and determine the degradation score based on the evaluation. The sensor data, for instance, may be point cloud generated by a LIDAR sensor, image generated by a camera, other types of sensor data, or some combination thereof. The degradation score may indicate a degradation in the accuracy of the sensor(s) capturing the sensor data.

The degradation evaluator 420 may compare the degradation score with a threshold score to determine whether the AV is in a degraded state. For instance, in response to a determination that the degradation score is greater than (or at least equal to) the threshold score, the degradation evaluator 420 may determine that the AV is in a degraded state, versus the degradation evaluator 420 may determine that the AV is in not in a degraded state in response to a determination that the degradation score is no greater than (or lower than) the threshold score.

In some embodiments (e.g., embodiments where the degradation evaluator 420 determines that the AV is in a degraded state), the degradation evaluator 420 may also determine the severity of the AV's degradation, e.g., based on the degradation score, a duration of time the degradation lasts, other factors about the degradation, or some combination thereof. The degradation evaluator 420 may compare the degradation score with one or more threshold scores to determine the severity level of the AV's degradation. Different threshold scores may correspond to different levels of severity. In an example, a degradation score below a first threshold score may indicate that the severity level of the degradation is very low (or that the AV is not in a degraded state). A degradation score above the first threshold score but below a second threshold score may indicate that the severity level of the degradation is low. A degradation score above the second threshold score but below a third threshold score may indicate that the severity level of the degradation is medium. A degradation score above the third threshold score may indicate that the severity level of the degradation is high. In other embodiments, the degradation evaluator 420 may use different, fewer, or more severity levels to measure the severity of the AV's degradation. The degradation evaluator 420 may provide information of the degraded state of the AV (e.g., the degradation score, the severity level, or both) to the response module 430 for the response module 430.

The response module 430 may respond to the degradation of the AV based on the severity level of the degradation. For instance, the response module 430 may send a command to the control module 340 of the AV, and the command may specify the response so that the control module 340 can plan and control the operation of the AV in accordance with the response determined by the response module 430. In some embodiments, the response module 430 may determine, e.g., based on the severity level, a maneuver of the AV as the response of the AV to the degradation. In an example where the severity levels can be very low, low, medium, and high, the response module 430 may cause the AV to finish the service and navigate to a home facility for the very low-severity level. The response module 430 may cause the AV to circle around a block or navigate to a parking area for a low-severity level, but cause the AV to pull over for a medium-severity level and cause the AV to stop immediately and request remote assistance for a high-severity level.

The response module 430 may select the maneuver from a plurality of candidate maneuvers based on the severity level. The candidate maneuvers may include continuing the operation of the AV with no change, finishing the service and navigating to a home facility, pausing the service, moving out of the traffic lane, circling in the environment, pullover, navigating to a parking area, stopping in the traffic lane, requesting for remote assistance, other types of responses, or some combination thereof. The response module 430 may classify the candidate maneuvers into categories corresponding to different severity levels. For instance, the response module 430 may label the responses as very low-severity maneuver (e.g., continuing the operation of the AV with no change, finishing the service and navigating to a home facility, etc.), low-severity maneuvers (e.g., pausing the service, driving in the environment along a new route, navigating to a parking area, etc.), medium-severity maneuver (e.g., moving out of the traffic lane, pullover, etc.), high-severity maneuver (e.g., stopping in the traffic lane, requesting for remote assistance, etc.), and so on.

In some embodiments, the response module 430 may select a maneuver from multiple maneuvers in the same category based on an evaluation of the feasibility and safety of these maneuvers. In an example where the severity level of the degradation is low and the low-severity maneuvers include circling in the environment and navigating to a parking area, the response module 430 may determine the feasibility and safety of each maneuver. For instance, the response module 430 may determine whether there is a parking area nearby that the AV can safely drive (e.g., based on a map of a local area or detection of the environment by the sensor suite 140) to or determine whether it is safe for the AV to circle in the environment. The response module 430 may determine a score measuring the feasibility and safety of each maneuver and select the maneuver having the highest score.

The recovery module 440 may facilitate recovery of the AV from the degradation after or when the AV implements the response determined by the response module 430. In some embodiments (such as embodiments where the severity level is below a threshold level, e.g., the high-severity level), the response determined by the response module 430 can facilitate recovery of the AV from the degradation, after which the AV may be able to resume its service. For instance, the environmental condition that caused the degradation may be improved or eliminated over time. The AV may be out of the degraded state after the environmental condition is improved.

The recovery module 440 may re-evaluate the degraded state of the AV periodically. For instance, the recovery module 440 may request for new data indicating the environmental condition. The recovery module 440 may send out requests for new data at a predetermined frequency, such as one request every certain number of seconds, minutes, hours, etc. In some embodiments, the recovery module 440 may determine the frequency based on a prediction of the amount of time it can take for the environmental condition to improve. In other embodiments, the frequency may be a fixed frequency. After receiving the new data, the recovery module 440 may instruct the degradation evaluation 420 to re-evaluate the degraded state of the AV, e.g., by using the approaches described above. The degradation evaluation 420 may determine a new degradation score. The degradation evaluation 420 may also determine a new severity level of the degradation. The recovery module 440 may determine whether to wait for further improvement of the environmental condition based on the result of the re-evaluation.

In an example where the environmental condition is a weather condition (e.g., fog, snow, haze, etc.), the recovery module 440 may determine to wait for further improvement of the weather in scenarios where the new severity level of the degradation is lower than the previous severity level. For instance, the recovery module 440 may determine to keep the AV in the recovery with the expectation that the weather would get better. The recovery module 440 may request for further new data at a later time and when the further new data indicates that the fog is gone or dropped to a level where the AV can safely drive, the recovery module 440 may cause the AV to drive, e.g., the AV may drive back to the traffic lane to finish the service. In scenarios where the degradation is at the same or higher severity level after a threshold recovery time, the recovery module 440 may determine that the recovery has failed and instruct the remote assistance requestor 450 to request remote assistance. Alternatively or additionally, the recovery module 440 may update the severity level and provide the updated severity level to the response module 430, and the response module 430 can determine a new response based on the updated severity level. The response module 430 may determine the threshold recovery time based on the severity level of the degradation. For instance, the threshold recovery time for a degradation at the medium-severity level may be shorter than the same degradation at the low-severity level.

The remote assistance requestor 450 sends out requests for remote assistance based on information from the response module 430 or the recovery module 440. In an example, the response module 430 may determine that the AV's degraded state is at a high-severity level and instruct the remote assistance requestor 450 to seek remote assistance. In an example, the response module 430 may determine that the AV's recovery has failed and instruct the remote assistance requestor 450 to seek remote assistance. The remote assistance requestor 450 may request a remote recovery of the AV, e.g., by the fleet management system 120. The remote assistance requestor 450 for provide information about the degradation (e.g., information about the cause of the degradation) to the fleet management system 120, and the fleet management system 120 may be able to recover the AV from the degradation through remotely controlling the AV, e.g., by updating the AV software, etc.

Additionally or alternatively, the remote assistance requestor 450 may request a retrieval of the AV. The remote assistance requestor 450 may provide the location of the AV to the fleet management system 120 or a remote agent. The fleet management system 120 or remote agent may initiate a retrieval of the AV. For example, a driver may be provided, and the driver can drive the AV. As another example, a towing vehicle may be sent to the AV to tow the AV.

Example Fleet Management System

Figure 5:
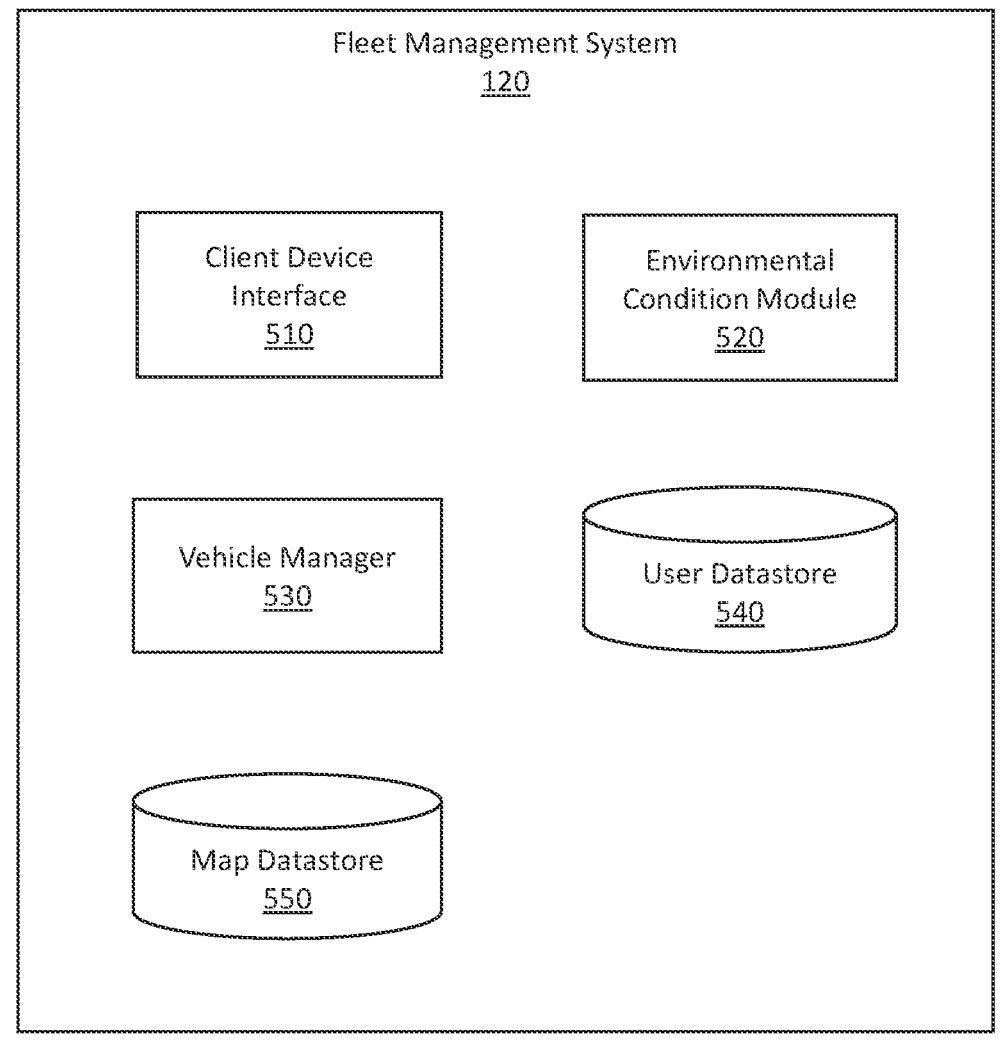
FIG. 5 is a block diagram showing a fleet management system, according to some embodiments of the present disclosure.

FIG. 5 is a block diagram showing the fleet management system 120, according to some embodiments of the present disclosure. The fleet management system 120 may manage and monitor AVs, e.g., AVs 110 in FIG. 1. In FIG. 5, the fleet management system 120 includes a client device interface 510, an environmental condition module 520, a vehicle manager 530, a user datastore 540, and a map datastore 550. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The client device interface 510 may provide interfaces to client devices, such as headsets, smartphones, tablets, computers, and so on. The client device interface 510 may provide one or more apps or browser-based interfaces that can be accessed by users, such as the users 135, using client devices, such as the client devices 130. The client device interface 510 enables the users to submit requests to a ride service provided or enabled by the fleet management system 120. In an example, the client device interface 510 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user. The client device interface 510 may enable the users to express their preferences for certain motions of the AV. The client device interface 510 may allow a user to indicate the user's preference for the AV's speed, acceleration rate, deceleration rate, jerk, snap, curvature, and so on. For instance, the client device interface 510 may allow a user to select whether the user prefers slow braking, normal braking, or harsh braking.

The environmental condition module 520 detects environmental conditions in association with operations of AVs. An environmental condition is a condition in an environment surrounding the AV. The condition may be a condition of an object (e.g., person, vehicle, traffic sign, building, tree, etc.) in the environment, a weather condition (e.g., rain, snow, ice, etc.), a traffic condition (e.g., traffic jam, road closure, etc.), or other types of environmental conditions. The environmental condition module 520 may detect an environmental condition based on data (e.g., sensor data, perceptions, etc.) from one or more AVs, such as the AV operating in the environment, the same AV operating in the environment at a different time, or another AV operating in the environment. The environmental condition module 520 may request such data from AVs.

In some embodiment, the environmental condition module 520 may search for one or more AVs that operate in the environment at or near a time of interest (e.g., the time of an AV behavior) and after finding these AVs, the environmental condition module 520 can request data from these AVs. In some embodiments (e.g., embodiments where the environmental condition module 520 cannot find any AV operating in the environment but for the AV providing the service), the environmental condition module 520 may request the vehicle manager 260 to send an AV to the environment and capture data needed by the environmental condition module 520. The environmental condition module 520 may provide an instruction to the AV. The instruction may include information of the environment (e.g., location), information of objects that need to be detected, specification of sensors to be used, setting of sensors, and so on.

The environmental condition module 520 may also use other data to detect environmental conditions. For instance, the environmental condition module 520 may retrieve data from a third-party system that publishes information related to environmental conditions. The third-party system may be a third-party reporting traffic conditions, a third-party predicting weather conditions, a social-media system, and so on. In some embodiments, the environmental condition module 520 may also determine a severity level of an environmental condition. The environmental condition module 520 may also determine the severity level based on a location of the environment or a location of the AV. For instance, the same level of a weather condition (e.g., fog, snow, etc.) may have different levels of severity for different location and may cause different levels of degradation to the AV.

The vehicle manager 530 manages and communicates with the fleet of AVs. The vehicle manager 530 assigns the AVs to various tasks and directs the movements of the AVs in the fleet. The vehicle manager 530 may instruct AVs to drive to other locations while not servicing a user, e.g., to improve geographic distribution of the fleet, to anticipate demand at particular locations, etc. The vehicle manager 530 may also instruct AVs to return to an AV facility for fueling, inspection, maintenance, or storage.

In some embodiments, the vehicle manager 530 may facilitate mitigation of outages of services provided by the AVs. For instance, the vehicle manager 530 may receive a request for remote assistance from an AV that fails to finish the service assigned to the AV. The request may include information about a degraded state of the AV, such as information of an environmental condition causing the degraded state, a severity level of the degraded state, and so on. The vehicle manager 530 may initiate a remote recovery based on the information in the request. The remote recovery may include commanding the AV to perform one or more operations to recover from the degraded state, providing updated software to the AV, and so on. Additionally or alternatively, the vehicle manager 530 may dispatch an agent to the AV and the agent can either fix the AV or retrieve the AV from the site. In some embodiments (e.g., embodiments where the AV cannot be recovered to properly finish the service), the vehicle manager 530 may dispatch another AV to finish the service and move the AV back to a home facility.

In some embodiments, the vehicle manager 530 may instruct one or more AVs from entering an environment based on information indicating that a condition in the environment can cause service outage. For AVs that have been assigned to perform services in the environment, the vehicle manager 530 may suspend the AVs to avoid degradations of the AVs in the environment. The information may be received from one or more other AVs that have navigated in the environment and detected the condition. Additionally or alternatively, the vehicle manager 530 may obtain the information from a third-party system, such as a weather forecasting system, a traffic monitoring system, and so on.

In some embodiments, the vehicle manager 530 selects AVs from the fleet to perform various tasks and instructs the AVs to perform the tasks. For example, the vehicle manager 530 receives a ride request from the client device interface 510. The vehicle manager 530 selects an AV to service the ride request based on the information provided in the ride request, e.g., the origin and destination locations. If multiple AVs in the AV fleet are suitable for servicing the ride request, the vehicle manager 530 may match users for shared rides based on an expected compatibility. For example, the vehicle manager 530 may match users with similar user interests, e.g., as indicated by the user datastore 540. In some embodiments, the vehicle manager 530 may match users for shared rides based on previously-observed compatibility or incompatibility when the users had previously shared a ride.

The vehicle manager 530 or another system may maintain or access data describing each of the AVs in the fleet of AVs, including current location, service status (e.g., whether the AV is available or performing a service; when the AV is expected to become available; whether the AV is schedule for future service), fuel or battery level, etc. The vehicle manager 530 may select AVs for service in a manner that optimizes one or more additional factors, including fleet distribution, fleet utilization, and energy consumption. The vehicle manager 530 may interface with one or more predictive algorithms that project future service requests and/or vehicle use and select vehicles for services based on the projections.

The vehicle manager 530 transmits instructions dispatching the selected AVs. In particular, the vehicle manager 530 instructs a selected AV to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 530 may dispatch the same AV to pick up additional users at their pickup locations, e.g., the AV may simultaneously provide rides to three, four, or more users. The vehicle manager 530 further instructs the AV to drive autonomously to the respective destination locations of the users.

The user datastore 540 stores information associated with users 135. The user datastore 540 stores information associated with rides requested or taken by the user 135. For instance, the user datastore 540 may store information of a ride currently being taken by a user 135, such as an origin location and a destination location for the user's current ride. The user datastore 540 may also store historical ride data for a user 135, including origin and destination locations, dates, and times of previous rides taken by a user. The user datastore 540 may also store expressions of the user 135 that are associated with a current ride or historical ride. In some cases, the user datastore 540 may further store future ride data, e.g., origin and destination locations, dates, and times of planned rides that a user has scheduled with the ride service provided by the AVs and fleet management system 120. Some or all of the information of a user 135 in the user datastore 540 may be received through the client device interface 510, an onboard computer (e.g., the onboard computer 150), a sensor suite of AVs (e.g., the sensor suite 140), a third-party system associated with the user and the fleet management system 120, or other systems or devices.

In some embodiments, the user datastore 540 stores data indicating user sentiments towards AV behaviors associated with ride services, such as information indicating whether a user feels comfortable or secured with an AV behavior. The fleet management system 120 may include one or more learning modules (not shown in FIG. 5) to learn user sentiments based on user data associated with AV rides, such as user expressions related to AV rides. The user datastore 540 may also store data indicating user interests associated with rides provided by AVs. The fleet management system 120 may include one or more learning modules (not shown in FIG. 5) to learn user interests based on user data. For example, a learning module may compare locations in the user datastore 540 with map datastore 550 to identify places the user has visited or plans to visit. For example, the learning module may compare an origin or destination address for a user in the user datastore 540 to an entry in the map datastore 550 that describes a building at that address. The map datastore 550 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 540.

In some embodiments, a user 135 is associated with a user profile stored in the user datastore 540. A user profile may include declarative information about the user 135 that was explicitly shared by the user 135 and may also include profile information inferred by the fleet management system 120. In one embodiment, the user profile includes multiple data fields, each describing one or more attributes of the user 135. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, an image of a user 135 may be tagged with information identifying the user 135 displayed in the image.

The map datastore 550 stores a detailed map of environments through which the AVs may travel. The map datastore 550 includes data describing roadways, such as e.g., locations of roadways, connections between roadways, roadway names, speed limits, traffic flow regulations, toll information, etc. The map datastore 550 may further include data describing buildings (e.g., locations of buildings, building geometry, building types), and data describing other objects (e.g., location, geometry, object type) that may be in the environments of AV. The map datastore 550 may also include data describing other features, such as bike lanes, sidewalks, crosswalks, traffic lights, parking lots, signs, billboards, etc.

Some of the map datastore 550 may be gathered by the fleet of AVs. For example, images obtained by the exterior sensors 210 of the AVs may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs may have one or more image processing modules to identify features in the captured images or other sensor data. This feature data may be stored in the map datastore 550. In some embodiments, certain feature data (e.g., seasonal data, such as Christmas decorations, or other features that are expected to be temporary) may expire after a certain period of time. In some embodiments, data captured by a second AV may indicate that a previously-observed feature is no longer present (e.g., a blow-up Santa has been removed) and in response, the fleet management system 120 may remove this feature from the map datastore 550.

Example Method of Mitigating AV Service Outage

Figure 6:
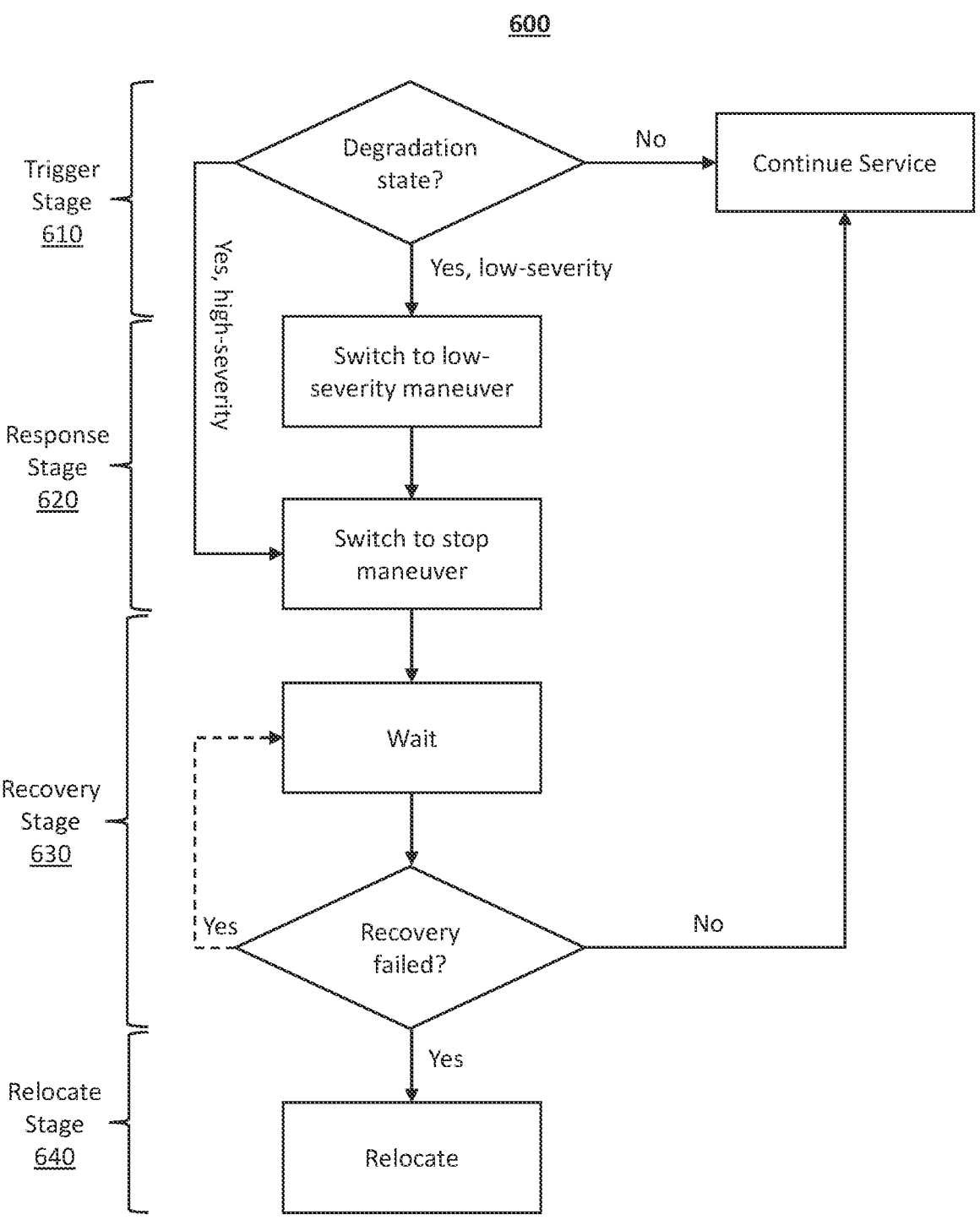
FIG. 6 illustrates an example resilience plan for mitigating AV service outage, according to some embodiments of the present disclosure.

FIG. 6 illustrates an example resilience plan 600 for mitigating AV service outage, according to some embodiments of the present disclosure. The resilience plan 600 may be partially or wholly implemented by a service outage mitigator of an AV 110, such as the service outage mitigator 350 in FIGS. 3 and 4. In some embodiments, one or more steps in the resilience plan 600 may be implemented by the fleet management system 120 or another AV 110 that is in communication with the AV 110. As shown in FIG. 6, the resilience plan 600 includes four stages: a trigger stage 610, a response stage 620, a recovery stage 630, and a relocate stage 640. In other embodiments, the resilience plan 600 may include different, fewer, or more stages.

In the trigger stage 610, a trigger for AV service outage mitigation may be detected. For instance, the service outage mitigator 350 may determine whether the AV 110 is in a degradation state, such as a state where the performance of the AV 110 is degraded or compromised. The degradation may be a result of the failure of one or more components (such as hardware, software, or firmware components) of the AV 110, one or more environmental conditions (such as weather condition, road condition, traffic condition, etc.), the failure regarding communication with the fleet management system 120 (e.g., loss of network connection, etc.), and so on. In some embodiments, the service outage mitigator 350 detects the trigger based on data generated by the AV 110 itself, data from another AV 110, data from the fleet management system 120, data from other sources, or some combination thereof. For instance, the service outage mitigator 350 may use data from the sensor suite 140 of the AV 110 to determine whether the performance of one or more sensors in the sensor suite 140 is degraded. Additionally or alternatively, the service outage mitigator 350 may receive information from another AV 110 or the fleet management system 120 that indicates a degradation in the performance of the AV 110.

The service outage mitigator 350 can determine whether the severity of the degradation reaches one or more threshold levels. The determination can be used to decide what response(s) to carry out in the response stage 620. For instance, the service outage mitigator 350 may determine a degradation score that indicates the level of degradation in the performance of the AV 110. The service outage mitigator 350 may determine whether the AV 110 is in a degradation state based on the degradation score. Additionally or alternatively, the service outage mitigator 350 may determine whether the degradation is low-severity degradation or high-severity degradation. In an example, the service outage mitigator 350 may determine whether the degradation score is beyond a first threshold (e.g., a low-severity threshold). In response to determining that the degradation score is beyond the first threshold, the service outage mitigator 350 determines that the AV 110 is in a degradation state. The service outage mitigator 350 may further determine whether the degradation score is beyond a second threshold (e.g., a high-severity threshold). In an embodiment where the degradation score is beyond the first threshold but lower than the second threshold, the service outage mitigator 350 determines that the AV 110 is in a low-severity degradation state. In an embodiment where the degradation score is beyond the second threshold, the service outage mitigator 350 determines that the AV 110 is in a high-severity degradation state.

After the service outage mitigator 350 determines that the AV 110 is not in a degradation state, the AV 110 may continue the service. For instance, the AV 110 may continue to navigate to a destination for the service along a previously determined route. After the service outage mitigator 350 determines that the AV 110 is in a degradation state, the AV 110 may change its maneuver in the response stage 620.

As shown in FIG. 6, after it is determined that the AV's degradation state is in the low-severity level, the AV 110 switches to low-severity maneuver, which may include leaving the traffic lane where the AV 110 is currently in. The AV 110 may pull over or move to a safe spot where the AV 110 can recover from the degradation state. An example of the safe spot may be a parking spot e.g., a parking spot on a street, in a parking lot, in a parking garage, etc., and drive to the parking spot. After the AV 110 reaches the safe spot, the AV 110 can switch to stop maneuver, i.e., the AV 110 stops moving and waits there for recovery. This can prevent the AV 110 from blocking the traffic lane and can retain the safety of the AV or the passenger(s) of the AV, if any. After it is determined that the AV's degradation state is in the high-severity level, the AV 110 can switch to stop maneuver directly. In some scenarios, the AV 110 may stop in the traffic lane.

In the recovery stage 630, the AV 110 may stay at the same spot and wait for the degradation state to be improved or removed. The service outage mitigator 350 may periodically re-evaluate the degradation of the state. For instance, the service outage mitigator 350 may determine a new degradation score at a predetermined frequency, such as every certain number of seconds, minutes, hours, etc. The service outage mitigator 350 may determine the frequency based on the condition that triggered the degradation. In an example where the condition is considered to last long (e.g., snowing that is predicted to last hours), the frequency may be once per a certain number of hours, versus in another example where the condition can be recover quickly (e.g., a loss of network connection), the frequency may be once per a certain number of seconds or minutes. In an embodiment where the new degradation score is below the first threshold, the AV 110 may be able to recover and resume the service. For instance, the AV 110 may go back to the traffic lane where it was driving before or during the trigger stage 610.

In another embodiment where the new degradation score is still above the first threshold, the AV 110 may continue to wait there and may continue to re-check the degradation state at the predetermined frequency, which is indicated by the dash arrow in FIG. 6. Alternatively, the service outage mitigator 350 may determine that the recovery is failed and may move to the relocate stage 640. In the relocate stage 640, the AV 110 may request a remote assistance that can help the AV 110 relocate. For example, an agent (e.g., a person, a towing vehicle, etc.) may retrieve the AV 110 from the spot where the AV is located. In another example, instead of relocating the AV 110, the agent may be able to fix the condition that causes the degradation so that the AV 110 can recover from the degradation state with the agent's assistance, after which the AV 110 may resume its service or take on a new service request.

Example Method of Mitigating AV Service Outage

FIG. 7 is a flowchart showing a method 700 of mitigating an outage of a service provided by a vehicle, according to some embodiments of the present disclosure. The method 700 may be performed by the service outage mitigator 350. Although the method 700 is described with reference to the flowchart illustrated in FIG. 7, many other methods of broadcasting vehicle capabilities to planning modules may alternatively be used. For example, the order of execution of the steps in FIG. 7 may be changed. As another example, some of the steps may be changed, eliminated, or combined.

The service outage mitigator 350 determines, in 710, a degradation score for a vehicle based on data indicating an environmental condition. The environmental condition is a condition of an environment where the vehicle performs an operation for providing a service, such as an operation for performing a ride service, delivery service, and so on. The degradation score indicates a degradation in a performance of the vehicle under the environmental condition. The data may be received from one or more sensors of the vehicle that detect the environmental condition. Alternatively or additionally, the data may be received from another vehicle including one or more sensors that detect the environmental condition. The another vehicle may be in communication with the vehicle.

In some embodiments, the environmental condition includes a weather condition in the environment. The performance of the vehicle includes a performance of one or more sensors of the vehicle. The data is generated by the one or more sensors through a detection of the weather condition by the one or more sensors.

The service outage mitigator 350 determines, in 720, whether the degradation score is beyond a threshold. In response to determining that the degradation score is beyond the threshold, the service outage mitigator 350 causes, in 730, the vehicle to pause the operation. For instance, the service outage mitigator 350 causes the vehicle to leave the traffic lane where the vehicle was driving. The service outage mitigator 350 may cause the vehicle to circle around or pull over. In some embodiments, the service outage mitigator 350 may determine a location where the vehicle can stop and wait for recovery from the degradation. The location may be in or near the environment. The service outage mitigator 350 may cause the vehicle to move to the location and to stop at the location.

The service outage mitigator 350 determines, in 740, a new degradation score for the vehicle based on new data indicating the environmental condition at a later time. The new degradation score indicates a degradation in a performance of the vehicle under the environmental condition at the later time. The new data may be received from one or more sensors of the vehicle that detect the environmental condition. Alternatively or additionally, the new data may be received from another vehicle including one or more sensors that detect the environmental condition. The other vehicle may be in communication with the vehicle. In some embodiments, the new data is generated by the one or more sensors through a detection of the weather condition by the one or more sensors.

In some embodiments, after causing the vehicle to pause the operation, the service outage mitigator 350 transmits a request for an update in the environmental condition at a predetermined frequency. The service outage mitigator 350 receives the new data in response to the request. The predetermined frequency may be a predetermined number of seconds, minutes, and so on. The service outage mitigator 350 may send the request to a sensor suite of the AV and receive the new data from the sensor suite.

The service outage mitigator 350 determines, in 750, whether the new degradation score is beyond a threshold. In response to determining that the new degradation score is beyond the threshold, the service outage mitigator 350 causes, in 760, the vehicle to resume the operation. For instance, the service outage mitigator 350 causes the vehicle to move back to the traffic lane where the vehicle paused the operation.

In some embodiments, in response to determining that the new degradation score is beyond the threshold, the service outage mitigator 350 may transmit a request for remote assistance. The remote assistance is to be provided by a system or person from outside the environment. The system may be the fleet management system 120. The person may be an agent of the fleet management system 120. The request for remote assistance may include a request for retrieving the vehicle from the environment.

In some embodiments, the service outage mitigator 350 may determine whether the degradation score is beyond another threshold. The other threshold may be higher than the threshold. In response to determining that the degradation score is beyond the other threshold, the service outage mitigator 350 may cause the vehicle to stop, e.g., to stop in the traffic lane.

In some embodiments, the service outage mitigator 350 may determine whether the degradation score or the new degradation score is beyond another threshold. In response to determining that the degradation score or the new degradation score is beyond the other threshold, the service outage mitigator 350 may transmit an instruction of preventing one or more other vehicles from entering the environment.

Select Examples

Example 1 provides a method, including determining a degradation score for a vehicle based on data indicating an environmental condition, the environmental condition being a condition of an environment where the vehicle performs an operation for providing a service, the degradation score indicating a degradation in a performance of the vehicle under the environmental condition; determining whether the degradation score is beyond a threshold; in response to determining that the degradation score is beyond the threshold, causing the vehicle to pause the operation; determining a new degradation score for the vehicle based on new data indicating the environmental condition at a later time, the new degradation score indicating a degradation in a performance of the vehicle under the environmental condition at the later time; determining whether the new degradation score is beyond the threshold; and in response to determining that the new degradation score is no greater than the threshold, causing the vehicle to resume the operation.

Example 2 provides the method of example 1, where the data or new data is received from one or more sensors of the vehicle that detect the environmental condition.

Example 3 provides the method of example 1 or 2, where the data or new data is received from another vehicle including one or more sensors that detect the environmental condition, and the another vehicle is in communication with the vehicle.

Example 4 provides the method of any of the preceding examples, where the environmental condition includes a weather condition in the environment, the performance of the vehicle includes a performance of one or more sensors of the vehicle, and the data or new data is generated by the one or more sensors through a detection of the weather condition by the one or more sensors.

Example 5 provides the method of any of the preceding examples, where receiving, by the vehicle, new data indicating the environmental condition at the later time includes transmitting a request for an update in the environmental condition at a predetermined frequency; and receiving the new data in response to the request.

Example 6 provides the method of any of the preceding examples, further including determining whether the degradation score is beyond another threshold; and in response to determining that the degradation score is beyond the another threshold, causing the vehicle to stop.

Example 7 provides the method of any of the preceding examples, further including in response to determining that the new degradation score is beyond the threshold, transmitting a request for remote assistance, the remote assistance to be provided by a system or person from outside the environment.

Example 8 provides the method of example 7, where the request for remote assistance includes a request for retrieving the vehicle from the environment.

Example 9 provides the method of any of the preceding examples, where causing the vehicle to pause the operation includes determining a location where the vehicle can stop and wait for recovery from the degradation; and causing the vehicle to move to the location and to stop at the location.

Example 10 provides the method of any of the preceding examples, further including in response to determining that the degradation score or the new degradation score is beyond another threshold, transmitting an instruction of preventing one or more other vehicles from entering the environment.

Example 11 provides one or more non-transitory computer-readable media storing instructions executable to perform operations, the operations including determining a degradation score for a vehicle based on data indicating an environmental condition, the environmental condition being a condition of an environment where the vehicle performs an operation for providing a service, the degradation score indicating a degradation in a performance of the vehicle under the environmental condition; determining whether the degradation score is beyond a threshold; in response to determining that the degradation score is beyond the threshold, causing the vehicle to pause the operation; determining a new degradation score for the vehicle based on new data indicating the environmental condition at a later time, the new degradation score indicating a degradation in a performance of the vehicle under the environmental condition at the later time; determining whether the new degradation score is beyond the threshold; and in response to determining that the new degradation score is no greater than the threshold, causing the vehicle to resume the operation.

Example 12 provides the one or more non-transitory computer-readable media of example 11, where the data or new data is received from one or more sensors of the vehicle that detect the environmental condition.

Example 13 provides the one or more non-transitory computer-readable media of example 11 or 12, where the data or new data is received from another vehicle including one or more sensors that detect the environmental condition, and the another vehicle is in communication with the vehicle.

Example 14 provides the one or more non-transitory computer-readable media of any one of examples 11-13, where the environmental condition includes a weather condition in the environment, the performance of the vehicle includes a performance of one or more sensors of the vehicle, and the data or new data is generated by the one or more sensors through a detection of the weather condition by the one or more sensors.

Example 15 provides the one or more non-transitory computer-readable media of any one of examples 11-14, where receiving, by the vehicle, new data indicating the environmental condition at the later time includes transmitting a request for an update in the environmental condition at a predetermined frequency; and receiving the new data in response to the request.

Example 16 provides the one or more non-transitory computer-readable media of any one of examples 11-15, where the operations further include determining whether the degradation score is beyond another threshold; and in response to determining that the degradation score is beyond the another threshold, causing the vehicle to stop.

Example 17 provides the one or more non-transitory computer-readable media of any one of examples 11-16, where the operations further include in response to determining that the degradation score or the new degradation score is beyond another threshold, transmitting an instruction of preventing one or more other vehicles from entering the environment.

Example 18 provides a computer system, including a computer processor for executing computer program instructions; and one or more non-transitory computer-readable media storing computer program instructions executable by the computer processor to perform operations including determining a degradation score for a vehicle based on data indicating an environmental condition, the environmental condition being a condition of an environment where the vehicle performs an operation for providing a service, the degradation score indicating a degradation in a performance of the vehicle under the environmental condition, determining whether the degradation score is beyond a threshold, in response to determining that the degradation score is beyond the threshold, causing the vehicle to pause the operation, determining a new degradation score for the vehicle based on new data indicating the environmental condition at a later time, the new degradation score indicating a degradation in a performance of the vehicle under the environmental condition at the later time, determining whether the new degradation score is beyond the threshold, and in response to determining that the new degradation score is no greater than the threshold, causing the vehicle to resume the operation.

Example 19 provides the computer system of example 18, where the data or new data is received from one or more sensors of the vehicle that detect the environmental condition or from another vehicle including one or more sensors that detect the environmental condition.

Example 20 provides the computer system of example 18 or 19, where the operations further include in response to determining that the degradation score or the new degradation score is beyond another threshold, transmitting an instruction of preventing one or more other vehicles from entering the environment.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:

determining an environmental condition based on data indicating the environmental condition, the environmental condition being a condition of an environment where a vehicle performs an operation for providing a service; and determining a degradation score for the vehicle based on determining the environmental condition, the degradation score indicating a degradation in an accuracy of one or more sensors of the vehicle while operating during the environmental condition, wherein the vehicle is an autonomous vehicle (AV), and wherein determining the degradation score comprises quantifying the degradation in the accuracy of the one or more sensors by comparing real-time sensor data from the one or more sensors to reference sensor data captured at a time where the environmental condition was not present;

determining whether the degradation score is beyond a threshold;

in response to determining that the degradation score is beyond the threshold, transmitting one or more first control signals to cause the vehicle to pause the operation by performing a recovery maneuver selected from the group consisting of:

circling an area;

navigating to a parking area; and pulling over to a safe location;

while the operation is paused during the recovery maneuver, periodically re-evaluating the environmental condition at a predetermined frequency by:

determining a change in the environmental condition based on new data indicating the environmental condition at a later time; and determining a new degradation score for the vehicle based on determining the change in the environmental condition, the new degradation score indicating a degradation in the accuracy of the one or more sensors of the vehicle while operating during the environmental condition at the later time;

determining whether the new degradation score is no greater than the threshold; and in response to determining that the new degradation score is no greater than the threshold, transmitting one or more second control signals to cause the vehicle to resume the operation.

2. The method of claim 1, wherein the data or new data is received from the one or more sensors of the vehicle that detect the environmental condition.

3. The method of claim 1, wherein the data or new data is received from another vehicle including another one or more sensors that detect the environmental condition, and the another vehicle is in communication with the vehicle.

4. The method of claim 1, wherein:

the environmental condition includes a weather condition in the environment;

the operation includes a performance of the one or more sensors of the vehicle; and the data or new data is generated by the one or more sensors through a detection of the weather condition by the one or more sensors.

5. The method of claim 1, wherein periodically re-evaluating the environmental condition at the predetermined frequency further comprises:

transmitting a request for an update in the environmental condition at the predetermined frequency; and receiving the new data in response to the request.

6. The method of claim 1, further comprising:

determining whether the degradation score is beyond another threshold; and in response to determining that the degradation score is beyond the another threshold, transmitting one or more third control signals to cause the vehicle to stop.

7. The method of claim 1, further comprising: in response to determining that the new degradation score is beyond the threshold, transmitting a request for remote assistance, the remote assistance to be provided by a system or person from outside the environment.

8. The method of claim 7, wherein the request for remote assistance comprises a request for retrieving the vehicle from the environment.

9. The method of claim 1, wherein transmitting the one or more first control signals to cause the vehicle to pause the operation comprises:

determining a location where the vehicle can stop and wait for recovery from the degradation; and transmitting the one or more first control signals to cause the vehicle to move to the location and to stop at the location.

10. The method of claim 1, further comprising: in response to determining that the degradation score or the new degradation score is beyond another threshold, transmitting an instruction of preventing one or more other vehicles from entering the environment.

11. One or more non-transitory computer-readable media storing instructions executable to perform operations, the operations comprising:

determining an environmental condition based on data indicating the environmental condition, the environmental condition being a condition of an environment where a vehicle performs an operation for providing a service; and determining a degradation score for the vehicle based on determining the environmental condition, the degradation score indicating a degradation in an accuracy of one or more sensors of the vehicle while operating during the environmental condition, wherein the vehicle is an autonomous vehicle (AV), and wherein determining the degradation score comprises quantifying the degradation in the accuracy of the one or more sensors by comparing real-time sensor data from the one or more sensors to reference sensor data captured at a time where the environmental condition was not present;

determining whether the degradation score is beyond a threshold;

in response to determining that the degradation score is beyond the threshold, transmitting one or more first control signals to cause the vehicle to pause the operation by performing a recovery maneuver selected from the group consisting of:

circling an area;

navigating to a parking area; and pulling over to a safe location;

while the operation is paused during the recovery maneuver, periodically re-evaluating the environmental condition at a predetermined frequency by:

determining a change in the environmental condition based on new data indicating the environmental condition at a later time; and determining a new degradation score for the vehicle based on determining the change in the environmental condition, the new degradation score indicating a degradation in the accuracy of the one or more sensors of the vehicle while operating during the environmental condition at the later time;

determining whether the new degradation score is no greater than the threshold; and in response to determining that the new degradation score is no greater than the threshold, transmitting one or more second control signals to cause the vehicle to resume the operation.

12. The one or more non-transitory computer-readable media of claim 11, wherein the data or new data is received from the one or more sensors of the vehicle that detect the environmental condition.

13. The one or more non-transitory computer-readable media of claim 11, wherein the data or new data is received from another vehicle including another one or more sensors that detect the environmental condition, and the another vehicle is in communication with the vehicle.

14. The one or more non-transitory computer-readable media of claim 11, wherein:

the environmental condition includes a weather condition in the environment;

the operation includes a performance of the one or more sensors of the vehicle; and the data or new data is generated by the one or more sensors through a detection of the weather condition by the one or more sensors.

15. The one or more non-transitory computer-readable media of claim 11, wherein periodically re-evaluating the environmental condition at the predetermined frequency further comprises:

transmitting a request for an update in the environmental condition at the predetermined frequency; and receiving the new data in response to the request.

16. The one or more non-transitory computer-readable media of claim 11, wherein the operations further comprise:

determining whether the degradation score is beyond another threshold; and in response to determining that the degradation score is beyond the another threshold, transmitting one or more third control signals to cause the vehicle to stop.

17. The one or more non-transitory computer-readable media of claim 11, wherein the operations further comprise: in response to determining that the degradation score or the new degradation score is beyond another threshold, transmitting an instruction of preventing one or more other vehicles from entering the environment.

18. A computer system, comprising:

a computer processor for executing computer program instructions; and one or more non-transitory computer-readable media storing computer program instructions executable by the computer processor to perform operations comprising:

determining an environmental condition based on data indicating the environmental condition, the environmental condition being a condition of an environment where a vehicle performs an operation for providing a service; and determining a degradation score for the vehicle based on determining the environmental condition, the degradation score indicating a degradation in an accuracy of one or more sensors of the vehicle while operating during the environmental condition, wherein the vehicle is an autonomous vehicle (AV), and wherein determining the degradation score comprises quantifying the degradation in the accuracy of the one or more sensors by comparing real-time sensor data from the one or more sensors to reference sensor data captured at a time where the environmental condition was not present;

determining whether the degradation score is beyond a threshold;

in response to determining that the degradation score is beyond the threshold, transmitting one or more first control signals to cause the vehicle to pause the operation by performing a recovery maneuver selected from the group consisting of:

circling an area;

navigating to a parking area; and pulling over to a safe location;

while the operation is paused during the recovery maneuver, periodically re-evaluating the environmental condition at a predetermined frequency by:

determining a change in the environmental condition based on new data indicating the environmental condition at a later time; and determining a new degradation score for the vehicle based on determining the change in the environmental condition, the new degradation score indicating a degradation in the accuracy of the one or more sensors of the vehicle while operating during the environmental condition at the later time;

determining whether the new degradation score is no greater than the threshold; and in response to determining that the new degradation score is no greater than the threshold, transmitting one or more second control signals to cause the vehicle to resume the operation.

19. The computer system of claim 18, wherein the data or new data is received from one or more sensors of the vehicle that detect the environmental condition or from another vehicle including another one or more sensors that detect the environmental condition.

20. The computer system of claim 18, wherein the operations further comprise: in response to determining that the degradation score or the new degradation score is beyond another threshold, transmitting an instruction of preventing one or more other vehicles from entering the environment.

* * * * *